(12) United States Patent
Kim (10) Patent No.: US 8,348,233 B2
(45) Date of Patent: Jan. 8, 2013

(54) BUTTERFLY VALVE

(75) Inventor: Yoon-Chul Kim, Gyeonggi-Do (KR)

(73) Assignee: Seokwang Mfg. Co., Ltd., Gyeonggi-do (KR)

( * ) Notice: Subject to any disclaimer, the term of this patent is extended or adjusted under 35 U.S.C. 154(b) by 258 days.

(21) Appl. No.: 12/847,425

(22) Filed: Jul. 30, 2010

(65) Prior Publication Data

US 2011/0024659 A1    Feb. 3, 2011

Related U.S. Application Data

(60) Provisional application No. 61/230,528, filed on Jul. 31, 2009.

(30) Foreign Application Priority Data

Feb. 8, 2010   (KR) .................. 10-2010-0011656

(51) Int. Cl.
*F16K 25/00* (2006.01)
*F16H 21/00* (2006.01)
*F16H 19/08* (2006.01)

(52) U.S. Cl. .............. 251/188; 251/187; 74/22 R; 74/29

(58) Field of Classification Search .................. 251/187, 251/188, 192, 251, 291, 292; 74/22 R, 23, 74/89.23, 89, 29, 89.34, 89.35, 89.45, 424 VA
See application file for complete search history.

(56) References Cited

U.S. PATENT DOCUMENTS

| | | | | | |
|---|---|---|---|---|---|
| 1,643,753 | A | * | 9/1927 | Slattery | 251/94 |
| 3,627,259 | A | * | 12/1971 | Williams | 251/153 |
| 3,697,042 | A | * | 10/1972 | Killian | 251/163 |
| 4,519,578 | A | * | 5/1985 | Boeckman et al. | 251/163 |
| 4,989,641 | A | * | 2/1991 | Jones et al. | 137/625.11 |
| 5,005,805 | A | * | 4/1991 | Morris et al. | 251/229 |
| 6,079,695 | A | * | 6/2000 | Gasaway et al. | 251/305 |
| 2002/0175306 | A1 | * | 11/2002 | Gomi et al. | 251/292 |

* cited by examiner

*Primary Examiner* — John K Fristoe, Jr.
*Assistant Examiner* — Kevin Barss
(74) *Attorney, Agent, or Firm* — Birch, Stewart, Kolasch & Birch, LLP (57) ABSTRACT

A butterfly valve comprises a valve body, a seat ring mounted on a flow passage of the valve body, a disc rotatably mounted to the valve body and configured to open and close the flow passage by being attached to the seat ring; and a driving device configured to linearly move and rotate the disc so as to prevent interference between the disc and the seat ring when the flow passage of the valve body is open and closed.

8 Claims, 8 Drawing Sheets

BUTTERFLY VALVE

CROSS-REFERENCE TO A RELATED APPLICATION

The present application claims priority benefit to the following applications, which contents are all incorporated by reference herein: U.S. Provisional Application No. 61/230,528 filed on Jul. 31, 2009, and Korean Patent Application No. 10-2010-0011656 filed on Feb. 8, 2010.

BACKGROUND OF THE INVENTION

1. Field of the Invention The present invention relates to a butterfly valve, and particularly, to a butterfly valve having a structure capable of preventing interference between a seat ring and a disc.

2. Background of the Invention

Generally, valves are installed at pipes which form a flow passage, and serve to stop or maintain fluid flow. One type of these valves, a butterfly valve is configured to open and close a conduit according to rotations of a disc installed inside a valve body. A seat ring is mounted in the butterfly valve, and a disc has a structure to close the conduit by being attached to the seat ring.

While the disc is rotated, the disc and the seat ring come in contact with each other. As the disc and the seat ring repeatedly come in contact with each other, the seat ring may be abraded. This abrasion of the seat ring may result in water leakage between the disc and the seat ring. Accordingly, a user may have inconvenience in replacing the abraded seat ring by a new one.

SUMMARY OF THE INVENTION

Therefore, an object of the present invention is to provide a butterfly valve having a structure capable of preventing interference between a seat ring and a disc when a flow passage of a valve body is open and closed.

To achieve these and other advantages and in accordance with the purpose of the present invention, as embodied and broadly described herein, there is provided a butterfly valve, comprising: a valve body; a seat ring mounted on a flow passage of the valve body; a disc rotatably mounted to the valve body, and configured to open and close the flow passage by being attached to the seat ring; and a driving device configured to linearly move and rotate the disc so as to prevent interference between the disc and the seat ring when the flow passage of the valve body is open and closed.

The butterfly valve may further comprise a shaft mounted to the valve body so as to perform a linear motion and a rotational motion, and configured to connect the disc and the driving device to each other.

The driving device may comprise a driving unit configured to linearly move or rotate the shaft with respect to the valve body, and a motion converting unit configured to move the disc in a direction to be close to or distant from the seat ring as the shaft is linearly moved.

The driving unit may include a driving shaft rotatably mounted to a housing and having a manipulation wheel, a slide nut slidably-moving on the driving shaft as the driving shaft is rotated, a first driving unit configured to linearly move the shaft as the slide nut is slidably moved, and a second driving unit configured to rotate the shaft as the slide nut is slidably moved.

The first driving unit may include a drive nut coupled to the shaft, and configured to linearly move the shaft by being rotated, and a link assembly connected between the slide nut and the drive nut, and configured to rotate the drive nut as the slide nut is slidably moved.

The slide nut may be screw-coupled to a screw thread of the driving shaft, and the drive nut may be screw-coupled to a screw thread of the shaft.

The link assembly may include a link having one end rotatably connected to the slide nut, and an arm having one end rotatably connected to another end of the link, and another end fixed to the drive nut.

The second driving unit may include a yoke having one end fixed to the shaft, and rotated by being engaged with the slide nut when the slide nut is moved.

The slide nut and the yoke may be engaged with each other by a guide unit. And, the guide unit may include a protrusion protrudingly formed at the driving shaft, and a slot formed at another end of the yoke and inserting the protrusion thereinto.

A shaft guide covering an outer side surface of the shaft may be coupled to the disc. And, the motion converting unit may include first and second wedges respectively formed at the disc and the shaft guide at positions facing the shaft, and third and fourth wedges formed at the shaft and contacting the first and second wedges, respectively.

The first to fourth wedges may be provided with inclination surfaces along which the disc and the shaft guide are moved when the shaft is moved.

In the present invention, the disc may perform a linear motion (rotational motion) at the initial stage, and perform a rotational motion (linear motion) at the rest stage when the flow passage of the valve body is open and closed. This may prevent contact between the disc and the seat ring, thereby preventing abrasion of the seat ring.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, a butterfly valve according to the present invention will be explained in more detail with reference to the attached drawings.

Figure 1:
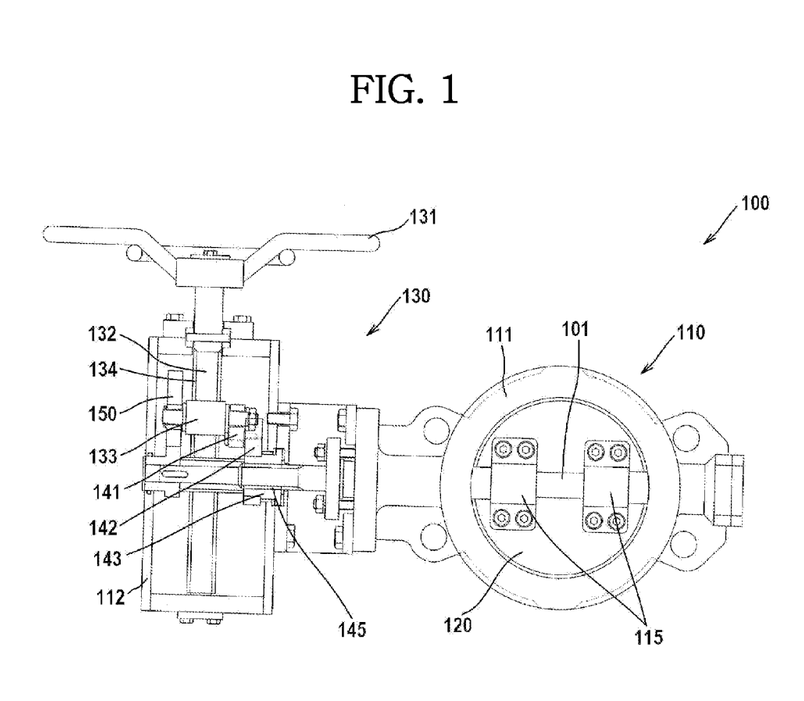
FIG. 1 is a frontal section view of a butterfly valve according to a first embodiment of the present invention.
Figure 2:
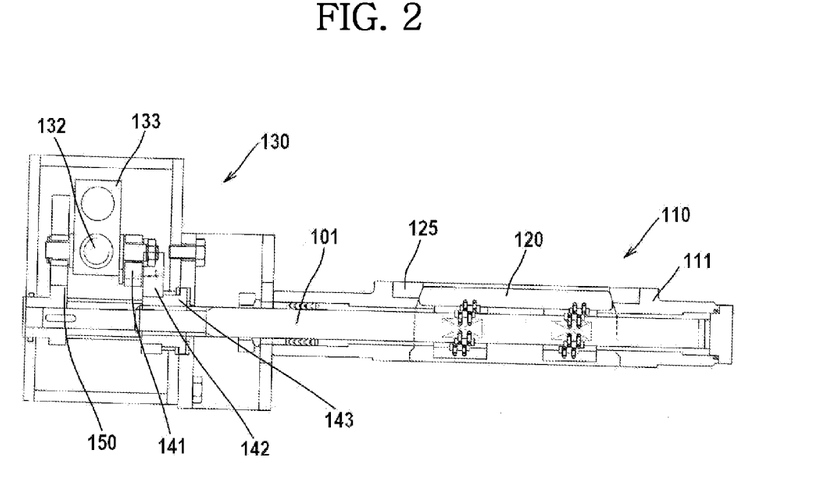
FIG. 2 is a planar section view of the butterfly valve of FIG. 1.

FIG. 1 is a frontal section view of a butterfly valve according to a first embodiment of the present invention, and FIG. 2 is a planar section view of the butterfly valve of FIG. 1.

The butterfly valve 100 according to the present invention comprises a valve body 111, a seat ring 125 mounted on a flow passage of the valve body 111, a disc 120 rotatably mounted to the valve body 111, and configured to open and close the flow passage by being attached to the seat ring, and a driving device configured to linearly move and rotate the disc 120 when the flow passage of the valve body 111 is open and closed.

The valve body 111 is configured to be connectable between conduits. And, the valve body 111 includes an inlet into which a fluid is introduced, and an outlet from which the introduced fluid is discharged out.

The seat ring 125 is mounted on an inner surface of the valve body 111, and may be positioned at the inlet or outlet of the valve body 111.

The disc 120 is mounted in the valve body 111, and is configured to open and close one of the inlet and outlet of the valve body 111. The disc 120 has a shape corresponding to the seat ring 125, and is configured to be attached to the seat ring 125. Referring to FIGS. 1 and 2, a state that the disc 120 and the seat ring 125 are attached to each other may be called as a 'closed state'. And, a state that the flow passage is open as the disc 120 has been rotated by about 90° in the closed state may be called as an 'open state'.

A shaft 101 is provided between the disc 120 and the valve body 111. The shaft 101 is mounted to the valve body 111 so as to perform a linear motion and a rotational motion, and is configured to connect the disc 120 and the driving device to each other.

An assembly among the valve body 111, the disc 120, the seat ring 125 and the shaft 101 may be called as a valve unit 110.

The driving device linearly moves and rotates the disc 120 so as to prevent interference between the disc 120 and the seat ring 125 when the flow passage of the valve body 111 is open and closed.

The driving device includes a driving unit 130 configured to linearly move or rotate the shaft 101 with respect to the valve body 111, and a motion converting unit 116~119 configured to move the disc 120 in a direction to be close to or distant from the seat ring 125 as the shaft 101 is linearly moved. Detailed structures of the driving unit 130 and the motion converting unit 116~119 will be explained later.

Figure 3:
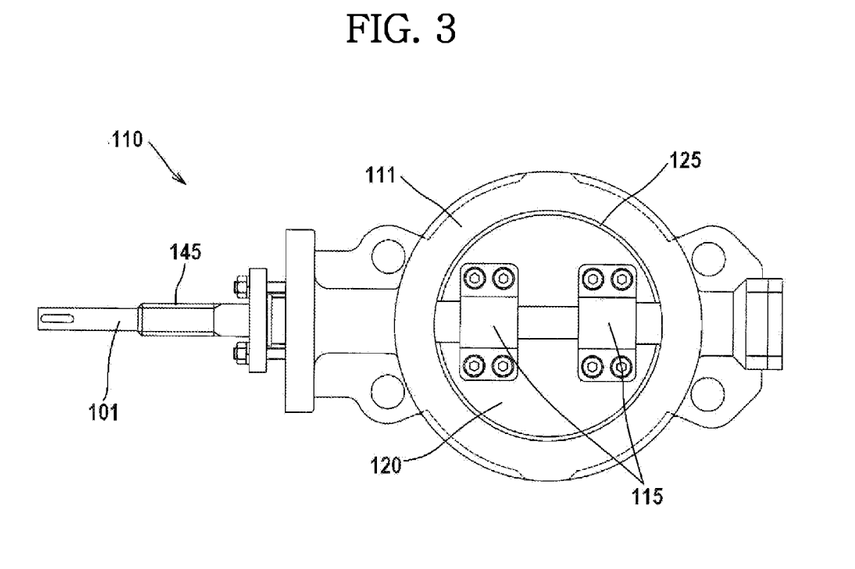
FIG. 3 is a frontal section view of a valve unit of FIG. 1.
Figure 4:
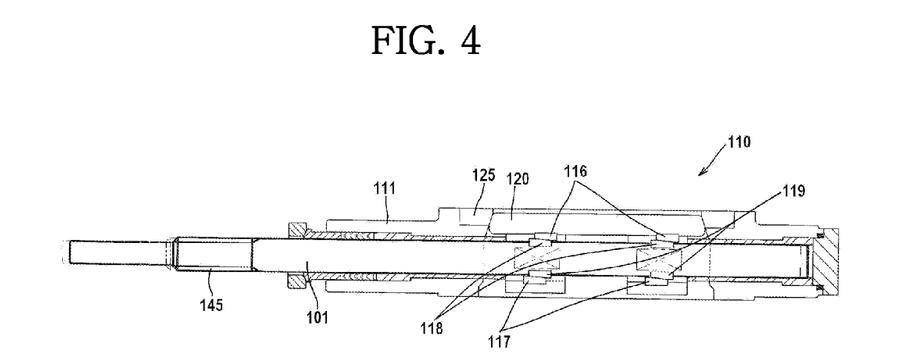
FIG. 4 is a planar section view of the valve unit of FIG. 3.
Figure 5:
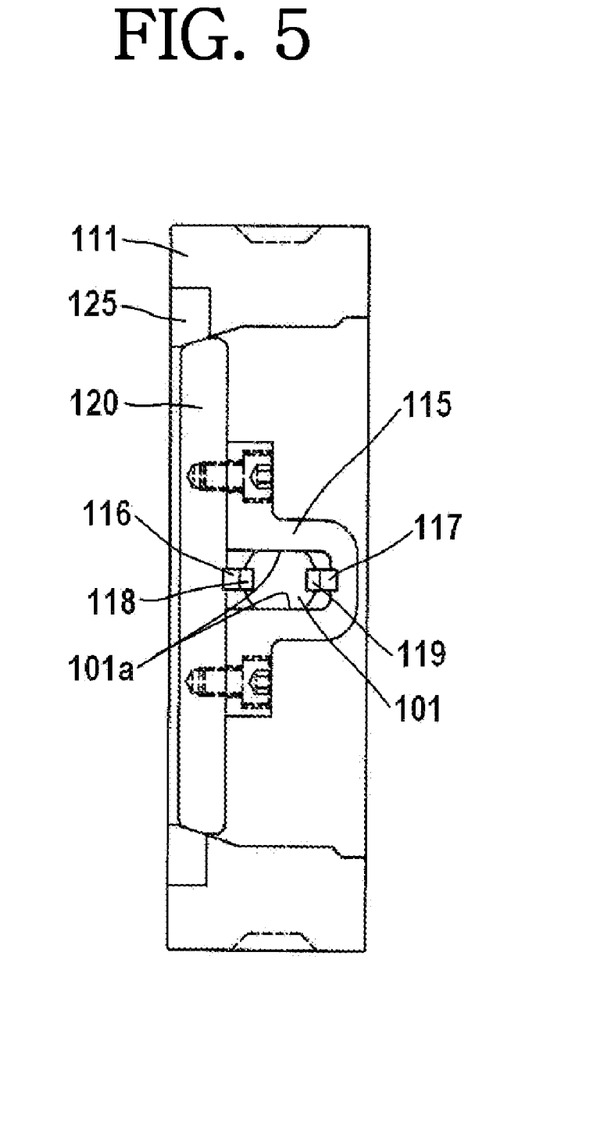
FIG. 5 is a lateral section view of the valve unit of FIG. 3.

FIG. 3 is a frontal section view of a valve unit of FIG. 1, FIG. 4 is a planar section view of the valve unit of FIG. 3, and FIG. 5 is a lateral section view of the valve unit of FIG. 3.

The shaft 101 is fixed to the disc 120 by a shaft guide 115. The shaft guide 115 is configured such that its inner side surface covers an outer side surface of the shaft 101, and is fixed to the disc 120. The shaft guide 115 may be fixed to the disc 120 by screw-coupling. A truncated portion 101a having a flat shape is formed on the outer side surface of the shaft 101, and the inner side surface of the shaft guide 115 supports the truncated portion 101a. As the shaft 101 is rotated, the disc 120 and the shaft guide 115 may be together rotated.

The shaft 101 performs a linear motion with respect to the disc 120 and the shaft guide 115. The disc 120 is configured to be movable in parallel to the flow passage of the valve body 111 as the shaft 101 is linearly moved. More concretely, the disc 120 is configured to be movable in a direction to be close to or distant from the seat ring 125 as the shaft 101 is moved in an axial direction. The disc 120 can be operated by the aforementioned motion converting unit 116-119.

The motion converting unit may include first and second wedges 116, 117 disposed at the disc 120 and the shaft guide 115, respectively, and third and fourth wedges 118, 119 formed at the shaft 101.

The first and second wedges 116, 117 are disposed at positions facing the shaft 101. And, the third and fourth wedges 118, 119 are formed at positions corresponding to the first and second wedges 116, 117, and contact the first and second wedges 116, 117, respectively.

The first to fourth wedges 116-119 are provided with inclination surfaces along which the disc 120 and the shaft guide 115 are moved when the shaft 101 is moved. In the present invention, the first to fourth wedges 116-119 are screw-coupled to the shaft 101. However, the first to fourth wedges 116-119 may be integrally formed with the shaft 101.

If the driving unit 130 is driven in the closed state, the shaft 101 is moved in the valve body 111 in an axial direction. Referring to FIG. 4, the shaft 101 is moved to the left side from the right side. During this process, the fourth wedge 119 slides on the second wedge 117, and the disc 120 is moved to a direction spacing from the seat ring 125 by force applied to the second wedge 117 by the fourth wedge 119.

After the disc 120 has been moved by a predetermined distance, the driving unit 130 rotates the shaft 101. As the disc 120 is rotated, the flow passage of the valve body 110 is open.

If the driving unit 130 is driven in the open state, the disc 120 is rotated to the closed state by the rotation of the shaft 101. When the shaft 101 has been rotated by a predetermined angle, the driving unit 130 linearly moves the shaft 101. Here, the shaft 101 is moved to the right side from the left side based on FIG. 4. During this process, the third wedge 118 slides on the first wedge 116, and the disc 120 is moved to a direction close to the seat ring 125 by force applied to the first wedge 116 by the third wedge 118. As a result, the disc 120 is attached to the seat ring 125.

Under these structures, the disc 120 is rotated without contacting the seat ring 125. Accordingly, abrasion of the seat ring 125 due to contact with the disc 120 may be prevented.

The shaft 101 is driven, by the driving unit, so as to perform a linear motion at the initial stage, whereas to perform a rotational motion at the rest stage. Hereinafter, configurations of the driving unit 130 for driving the shaft 101 will be explained in more details.

Figure 6:
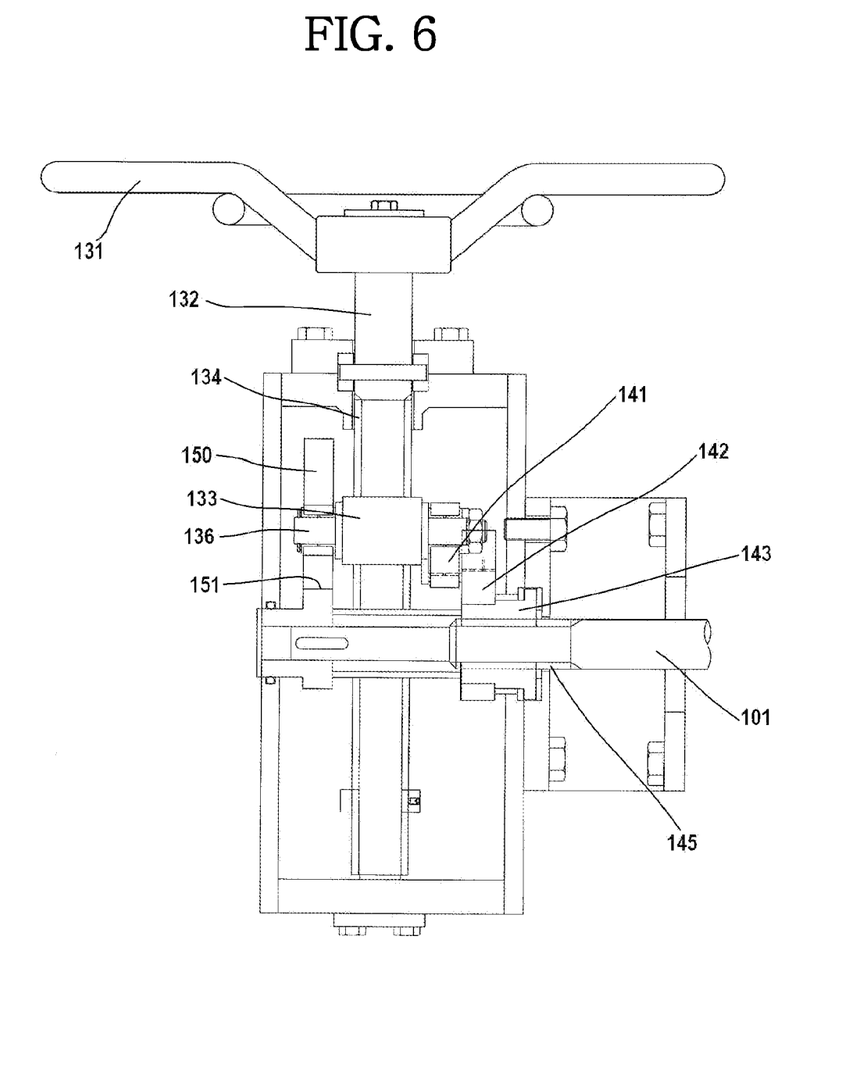
FIG. 6 is a frontal section view of a driving unit of FIG. 1.
Figure 7:
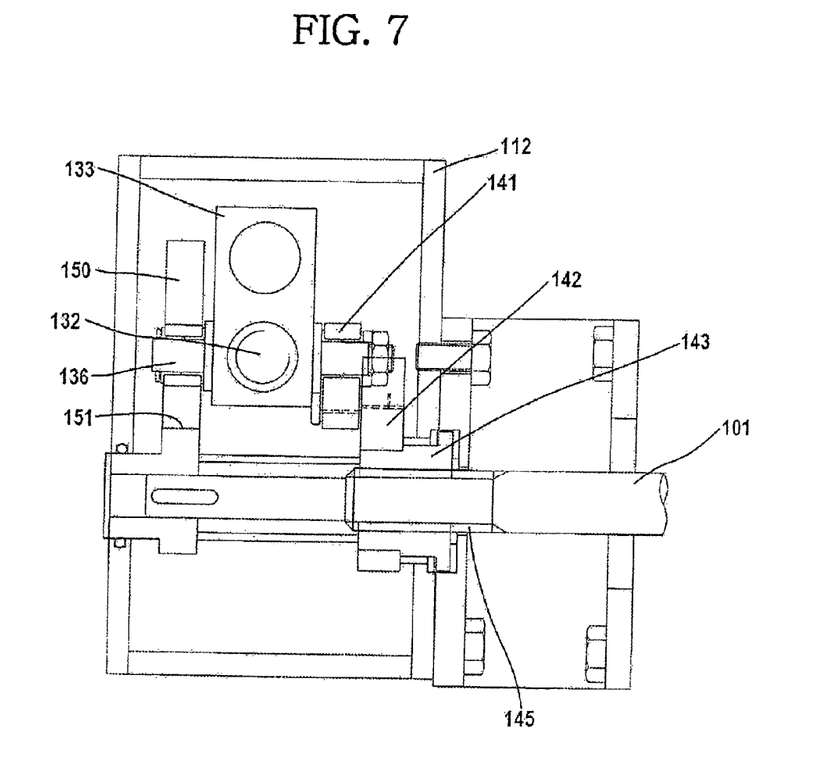
FIG. 7 is a planar section view of the driving unit of FIG. 6.

FIG. 6 is a frontal section view of the driving unit according to the first embodiment, and FIG. 7 is a planar section view of the driving unit of FIG. 6.

The driving unit 130 includes a housing 112, a driving shaft 132, a slide nut 133, a first driving unit, and a second driving unit.

The housing 112 is provided with an inner space for mounting the respective components therein. The housing 112 is coupled to the valve body 111, and may be coupled to the valve body 111 in a bolt coupling manner. Lubricant may be filled in the housing 112 so as to smoothly operate the respective components.

The driving shaft 132 is rotatably mounted in the housing 112, and has an end portion coupled to a manipulation wheel 131. As the manipulation wheel 131 is rotated, the driving shaft 132 is also rotated in the same direction as the manipulation wheel 131.

The slide nut 133 is coupled to the driving shaft 132 so as to linearly move on the driving shaft 132. As the driving shaft 132 is rotated, the slide nut 133 is moved on the driving shaft 132. For this, a screw thread 134 is formed on an outer circumferential surface of the driving shaft 132, and the slide nut 133 is screw-coupled to the screw thread 134 of the driving shaft 132.

The first driving unit serves to linearly move the shaft 101 as the slide nut 133 is moved, and may include a drive nut 143 and link assemblies 141, 142.

The drive nut 143 is coupled to the housing 110 and the shaft 101, and is configured to linearly move the shaft 101. A screw thread 145 is formed on an outer circumferential surface of the shaft 101, and the drive nut 143 is screw-coupled to the screw thread 145 of the shaft 101. The shaft 101 may be linearly moved as the drive nut 143 is rotated.

The link assemblies 141, 142 serve to rotate the drive nut 143 as the slide nut 133 performs a slide motion, and may include a link 141 and an arm 142. The link 141 and the arm 142 rotate the drive nut 143 as the slide nut 133 is linearly moved.

Figure 8:
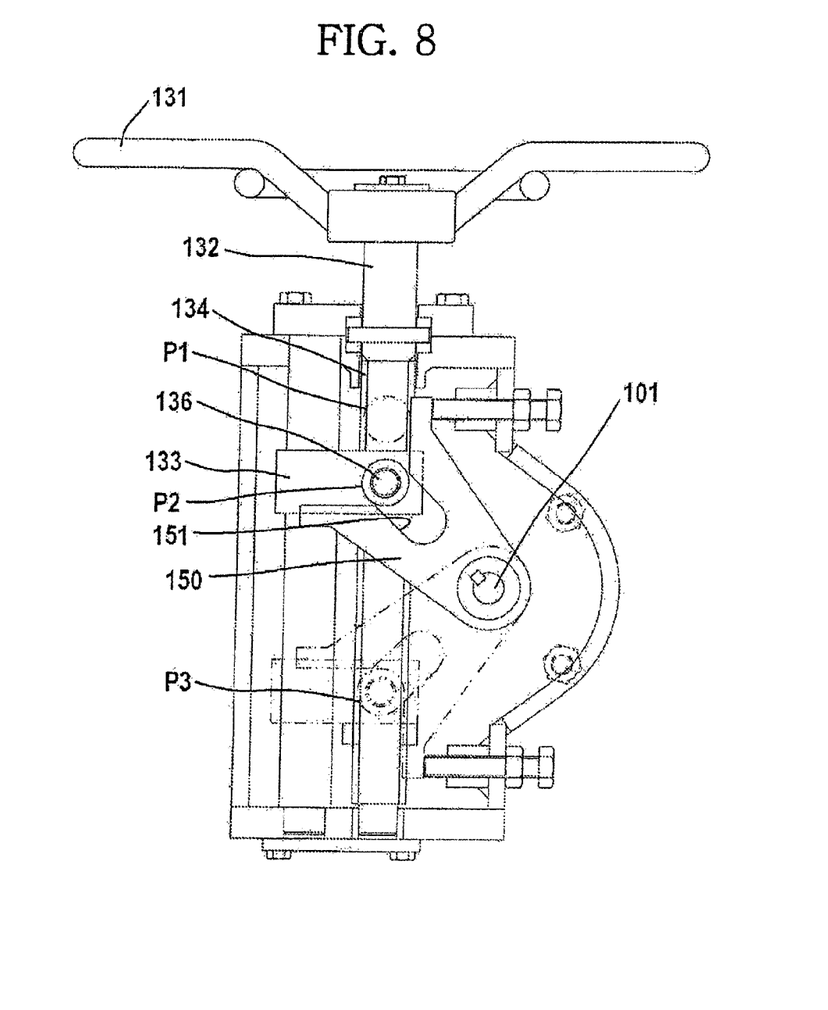
FIG. 8 is a lateral section view of the driving unit, which shows configurations of a link and an arm.

FIG. 8 is a lateral section view of the driving unit, which shows configurations of the link and the arm.

The link 141 has one end rotatably connected to the slide nut 133, and the arm 142 has one end rotatably connected to another end of the link 141 and another end fixed to the drive nut 143.

Referring to FIG. 8, the link 141 indicated by the two-dot chain line represents a closed state (P1), whereas the link 141 indicated by the solid line represents a state (P2) after the shaft 101 has been linearly moved at a predetermined stage in the closed state.

For instance, when the slide nut 133 has been downwardly moved in the closed state, the arm 142 is rotated in a counterclockwise direction based on the shaft 101 of FIG. 8 as the link 141 is rotated. As a result, the drive nut 143 is rotated, and thereby the shaft 101 is moved to the left side from the right side of FIG. 6.

The link assemblies 141, 142 may have not only the above configurations, but also any configurations to rotate the drive nut 143 as the slide nut 133 is linearly moved.

Figure 9:
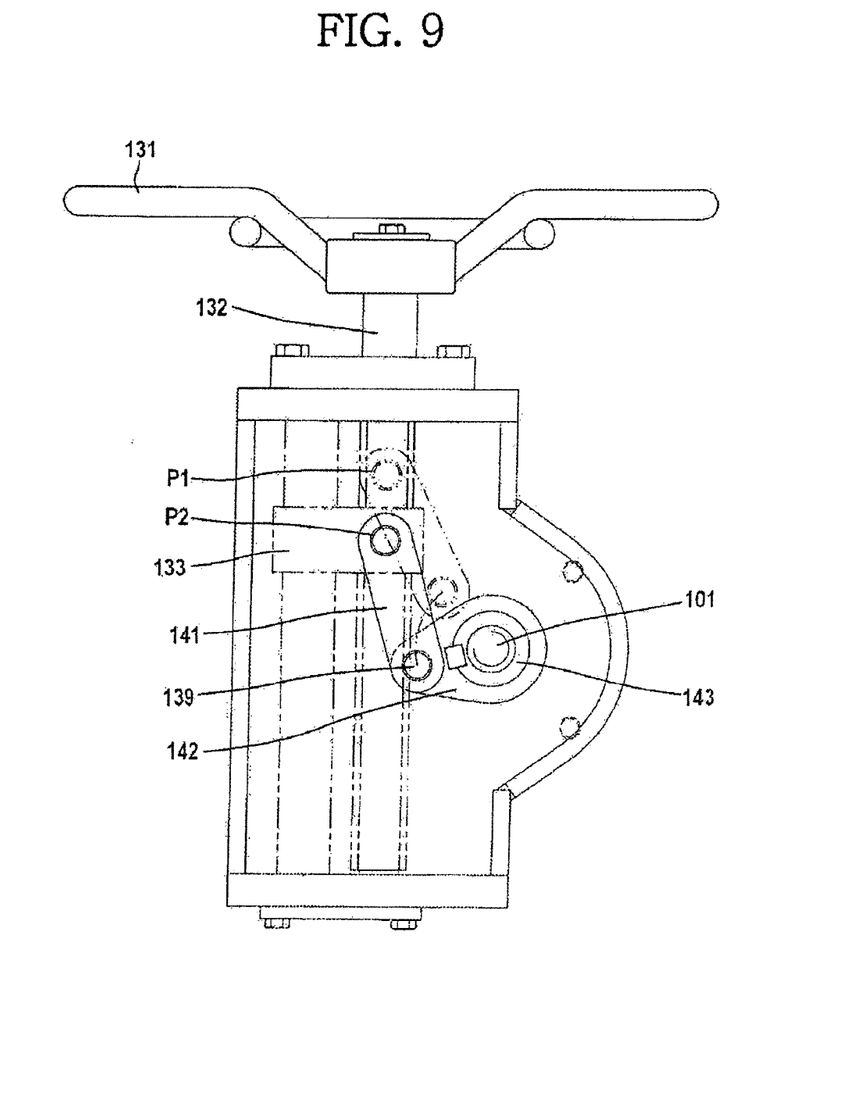
FIG. 9 is a lateral section view of the driving unit, which shows a configuration of a second driving unit.

FIG. 9 is a lateral section view of the driving unit, which shows a configuration of the second driving unit.

The second driving unit serves to rotate the shaft 101 as the slide nut 133 performs a sliding motion. The second driving unit may be implemented as a yoke 150 fixed to the shaft 101.

The yoke 150 has one end fixed to the shaft 101, and is configured to be rotated by a predetermined angle (e.g., 90° by an operating force of the slide nut 133. The yoke 150 is rotated by being engaged with the slide nut 133 while the slide nut 133 is moved.

In a case that the link 141 is coupled to one side of the slide nut 133, the yoke 150 may be disposed at another side of the slide nut 133.

The slide nut 133 and the yoke 150 may be engaged with each other by a guide unit. The guide unit may include a protrusion 136 protrudingly formed at another side of the slide nut 133, and a slot 151 formed at another end of the yoke 150. The protrusion 136 is moveable in an inserted state into the slot 151.

Referring to FIG. 9, the slide nut 133 and the yoke 150 indicated by the solid lines represent a state (P2) after the shaft 101 has been linearly moved at the initial stage in the closed state. And, the slide nut 133 and the yoke 150 indicated by the two-dot chain lines represent a state (P3) converted into the open state from the closed state as the shaft 101 has been rotated at the rest stage.

While the slide nut 133 is linearly moved at the initial stage in the closed state, the yoke 150 is in a stopped state. Accordingly, the shaft 101 is not rotated. However, if the protrusion 136 is inserted into the slot 151 as the slide nut 133 is continuously moved, the protrusion 136 comes in contact with an inner wall of the slot 151 thus to apply a force to the yoke 150. As a result, the yoke 150 is rotated in a counterclockwise direction of FIG. 9, and the shaft 101 fixed to the yoke 150 is also rotated in a counterclockwise direction. As the shaft 101 is rotated, the disc 120 is rotated to open the flow passage of the valve body 111.

Referring back to FIG. 8, the shaft 101 is rotated in a counterclockwise direction of FIG. 8 while the yoke 150 is rotated. And, the arm 142 is also rotated in a counterclockwise direction of FIG. 8. The arm 142 and the shaft 101 do not perform a relative rotation to each other. Accordingly, each component of the driving unit 130 may be operated without interference.

So far, it was explained a case in which the close state is converted to the open state. A case in which the open state is converted to the close state is performed in a reverse manner. More concretely, as the yoke 150 is rotated by rotation of the driving shaft 132, the shaft 101 is rotated. Then, the shaft 101 is linearly moved, thereby attaching the disc 120 to the seat ring 125.

As aforementioned, in the present invention, the disc 120 may perform a linear motion (rotational motion) at the initial stage, and perform a rotational motion (linear motion) at the rest stage when the flow passage of the valve body 111 is open and closed. This may prevent contact between the disc 120 and the seat ring 125, thereby preventing abrasion of the seat ring 125.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A butterfly valve, comprising:
a valve body;
a seat ring mounted on a flow passage of the valve body;
a disc rotatably mounted to the valve body, and configured to open and close the flow passage by being attached to the seat ring;
a driving device configured to linearly move and rotate the disc so as to prevent interference between the disc and the seat ring when the flow passage of the valve body is open and closed; and
a shaft mounted to the valve body so as to perform a linear motion and a rotational motion, and configured to connect the disc and the driving device to each other, wherein the driving device comprises:
a driving unit configured to linearly move or rotate the shaft with respect to the valve body; and a motion converting unit configured to move the disc in a direction to be close to or distant from the seat ring as the shaft is linearly moved, and wherein the driving unit comprises:

a driving shaft rotatably mounted to a housing, and having a manipulation wheel;

a slide nut slidably-moving on the driving shaft as the driving shaft is rotated;

a first driving unit configured to linearly move the shaft as the slide nut is slidably moved; and a second driving unit configured to rotate the shaft as the slide nut is slidably moved.

2. The butterfly valve of claim 1, wherein the first driving unit comprises:

a drive nut coupled to the shaft, and configured to linearly move the shaft by being rotated; and a link assembly connected between the slide nut and the drive nut, and configured to rotate the drive nut as the slide nut is slidably moved.

3. The butterfly valve of claim 2, wherein the slide nut is screw-coupled to a screw thread of the driving shaft, and wherein the drive nut is screw-coupled to a screw thread of the shaft.

4. The butterfly valve of claim 2, wherein the link assembly comprises:

a link having one end rotatably connected to the slide nut; and an arm having one end rotatably connected to another end of the link, and another end fixed to the drive nut.

5. The butterfly valve of claim 1 wherein the second driving unit comprises a yoke having one end fixed to the shaft, and rotated by being engaged with the slide nut when the slide nut is moved.

6. The butterfly valve of claim 5, wherein the slide nut and the yoke are engaged with each other by a guide unit, wherein the guide unit comprises:

a protrusion protrudingly formed at the slide nut; and a slot formed at another end of the yoke, and configured to insert the protrusion thereinto.

7. The butterfly valve of claim 1, further comprising a shaft guide coupled to the disc and covering an outer side surface of the shaft, wherein the motion converting unit comprises:

first and second wedges formed at the disc and the shaft guide, respectively, and disposed at positions facing the shaft; and third and fourth wedges formed at the shaft, and contacting the first and second wedges, respectively.

8. The butterfly valve of claim 7, wherein the first to fourth wedges are provided with inclination surfaces along which the disc and the shaft guide are moved when the shaft is moved.

* * * * *